(12) United States Patent
Patel et al.

(10) Patent No.: US 9,092,136 B1
(45) Date of Patent: Jul. 28, 2015

(54) PROJECTED BUTTON DISPLAY SYSTEM

(75) Inventors: Bhupesh Patel, Pomona, CA (US);
Chris A. Jameson, Fullerton, CA (US);
Timothy J. Bohr, Fountain Valley, CA (US); David F. Little, Claremont, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 253 days.

(21) Appl. No.: 13/155,980

(22) Filed: Jun. 8, 2011

(51) Int. Cl.
*G06F 3/01* (2006.01)
*G06F 3/0488* (2013.01)
*G06F 9/44* (2006.01)
*G06F 3/00* (2006.01)

(52) U.S. Cl.
CPC .......... *G06F 3/04886* (2013.01); *G06F 9/4443* (2013.01)

(58) Field of Classification Search
USPC ................. 715/727, 702, 863, 848, 823, 747; 345/690, 633, 156, 158
See application file for complete search history.

(56) References Cited

U.S. PATENT DOCUMENTS

| | | | |
|---|---|---|---|
| 4,038,523 A | 7/1977 | Widmer | |
| 5,096,271 A | 3/1992 | Portman | |
| 5,467,106 A | 11/1995 | Salomon | |
| 5,811,791 A | 9/1998 | Portman | |
| 6,424,386 B1 | 7/2002 | Shimizu | |
| 6,445,573 B1 | 9/2002 | Portman | |
| 6,997,301 B1 | 2/2006 | Seeley | |
| 7,148,935 B1 | 12/2006 | Ho | |
| 7,768,501 B1* | 8/2010 | Maddalozzo et al. | 345/173 |
| 8,018,579 B1* | 9/2011 | Krah | 356/4.01 |
| 8,866,745 B1* | 10/2014 | Schrick | 345/168 |
| 2003/0165048 A1* | 9/2003 | Bamji et al. | 361/681 |
| 2003/0174125 A1* | 9/2003 | Torunoglu et al. | 345/168 |
| 2004/0246200 A1* | 12/2004 | Fronzek | 345/7 |
| 2005/0169527 A1* | 8/2005 | Longe et al. | 382/177 |
| 2006/0101349 A1* | 5/2006 | Lieberman et al. | 715/773 |
| 2006/0103811 A1* | 5/2006 | May et al. | 353/69 |
| 2006/0267858 A1* | 11/2006 | Yun et al. | 345/1.1 |
| 2007/0063979 A1* | 3/2007 | Tran | 345/169 |

(Continued)

OTHER PUBLICATIONS

"Handheld Projector"; http://en.wikipedia.org/wiki/Handheld_projector; printed on May 17, 2010.

(Continued)

*Primary Examiner* — Amy Ng
*Assistant Examiner* — Toan Vu
(74) *Attorney, Agent, or Firm* — Angel N. Gerdzhikov; Donna P. Suchy; Daniel M. Barbieri

(57) ABSTRACT

A projected button display system, including a detector system, a projector system, and a controller. The detector system includes: a coarse detector subsystem comprising a proximity sensor configured to detect an operator's hand in an activation region; and, a fine detector subsystem configured to detect the position of an operator's finger on a display surface. The projector system is operatively connected to the detector system configured to provide a projected keyboard on the display surface in response to the detection of the operator's hand in the activation region. The projected keyboard is responsive to the touch of the operator's finger on the display surface. The controller is operatively connected to the detector system and the projector system. The controller provides an output signal a control/management system.

14 Claims, 5 Drawing Sheets

(56) References Cited

U.S. PATENT DOCUMENTS

| | | | |
|---|---|---|---|
| 2007/0242233 A1* | 10/2007 | Sokeila et al. | 353/69 |
| 2007/0291051 A1* | 12/2007 | Brown et al. | 345/647 |
| 2008/0106702 A1* | 5/2008 | Huonker | 353/82 |
| 2008/0136839 A1* | 6/2008 | Franko et al. | 345/634 |
| 2009/0079945 A1* | 3/2009 | Klosowiak et al. | 353/69 |
| 2009/0096746 A1* | 4/2009 | Kruse et al. | 345/156 |
| 2009/0262098 A1* | 10/2009 | Yamada | 345/175 |
| 2009/0302172 A1* | 12/2009 | Suddreth et al. | 244/236 |
| 2010/0079468 A1* | 4/2010 | Pance et al. | 345/501 |
| 2010/0177284 A1* | 7/2010 | Moizio et al. | 353/75 |
| 2010/0182236 A1* | 7/2010 | Pryor | 345/158 |
| 2010/0190548 A1* | 7/2010 | Motyl et al. | 463/25 |
| 2010/0205333 A1* | 8/2010 | Francois et al. | 710/62 |
| 2010/0214496 A1* | 8/2010 | Vogel et al. | 348/744 |
| 2010/0245799 A1* | 9/2010 | Kim et al. | 356/3 |
| 2010/0315336 A1* | 12/2010 | Butler et al. | 345/158 |
| 2011/0047459 A1* | 2/2011 | Van Der Westhuizen | 715/702 |
| 2011/0119638 A1* | 5/2011 | Forutanpour | 715/863 |
| 2011/0248913 A1* | 10/2011 | Willis et al. | 345/156 |
| 2011/0281252 A1* | 11/2011 | Pandya et al. | 434/325 |
| 2012/0017147 A1* | 1/2012 | Mark | 715/702 |
| 2012/0035934 A1* | 2/2012 | Cunningham | 704/260 |
| 2012/0221978 A1* | 8/2012 | Matas et al. | 715/835 |
| 2012/0229589 A1* | 9/2012 | Barrus | 348/14.08 |
| 2012/0235919 A1* | 9/2012 | Earnshaw et al. | 345/169 |
| 2012/0249463 A1* | 10/2012 | Leung et al. | 345/173 |
| 2012/0260177 A1* | 10/2012 | Sehrer | 715/727 |
| 2012/0272150 A1* | 10/2012 | Insler | 715/716 |
| 2012/0292986 A1* | 11/2012 | Riedel et al. | 307/9.1 |
| 2012/0307210 A1* | 12/2012 | Bennett | 353/7 |
| 2014/0063055 A1* | 3/2014 | Osterhout et al. | 345/633 |

OTHER PUBLICATIONS

"Projector Keystone Projector"; http://www.projectorpeople.com/resources/keystone-correction.asp; printed on Jun. 6, 2010.

Sharp Microelectronics, Inc., Model No. GP2Y0A21YK, GP2Y0A21YK Product specification sheet, "General Purpose Type Distance Measuring Sensors", undated; downloaded on Jun. 2, 2011; 4 pages.

Ping))™ Ultrasonic Distance Sensor (#28015) Product Specification Sheet, Parallax, Inc., v 1.5, Feb. 15, 2008, 12 pages.

* cited by examiner

PROJECTED BUTTON DISPLAY SYSTEM

BACKGROUND OF THE INVENTION

1. Field of the Invention

This invention relates to projected button display systems and more specifically to projected button display systems utilized with control/management systems.

2. Description of the Related Art

Within the aircraft cabin, the volume available for discrete switches, switch panels and small LCD displays has diminished to the point where airframers are restricting the depth of these, to the point where they are very difficult to place in the side ledge.

There are numerous patents that have issued that have involved advances in display systems for on-board entertainment systems. These include, for example, the following patents:

U.S. Pat. No. 7,148,935 entitled "On-Board Entertainment System Entertainment Display Retractor Position Sensor", issued to C. Ho, et al., discloses a position sensor for determining the relative physical location of a movable item via a combination of a sensor and an indicator plate affixed to an actuator device.

U.S. Pat. No. 6,424,386 entitled "Liquid Crystal Display Device", issued to T. Shimizu, discloses a liquid crystal display device comprising a housing mounted to a ceiling member of an airplane. An image control unit is fixed to the housing, and a liquid crystal display is fixed to a main shaft positioned at a center of rotation. In a retracting unit, a liquid crystal panel of the liquid crystal display is opposed to the image control unit, and stored inside a cover surrounding the housing. The whole height of the liquid crystal display device may be reduced, so as to secure the overhead clearance of the passengers.

In vehicles and particularly in aircraft minimizing size, weight, and power consumption of all systems on board is a significant discriminator when selecting equipment. Due to the limited space on vehicles, minimizing the equipment size allows for better utilization of passenger space in the cabin.

The technology of a Pico projector (also known as a handheld projector, pocket projector or mobile projector) is an emerging technology that applies the use of a handheld device. It is a response to the emergence of compact portable devices such as mobile phones, personal digital assistants, and digital cameras which have sufficient storage capacity to handle presentation materials but little space to accommodate an attached display screen. Handheld projectors involve miniaturized hardware and software that can project digital images onto any nearby viewing surface, such as a wall. The system comprises four main parts: the electronics, the light sources (e.g. LED or laser), the combiner optic, and the scanning mirrors. First, the electronics system turns the image into an electronic signal. Next the electronic signals drive light sources with different colors and intensities down different paths. In the combiner optic the different light paths are combined into one path demonstrating a palette of colors. Finally, the mirrors copy the image pixel by pixel and can then project the image. This entire system is compacted into one very tiny chip. An important design characteristic of a handheld projector is the ability to project a clear image, regardless of the physical characteristics of the viewing surface. (http://en.wikipedia.org/wiki/Handheld_projector[5/17/2010])

In projector systems "keystoning" may be problematic. "Keystoning" occurs when a projector is aligned non-perpendicularly to a screen, or when the projection screen has an angled surface. The image that results from one of these misalignments will look trapezoidal rather than square. There are basically two methods of keystone correction, manual and digital. Manual keystone correction is essentially a physical adjustment to the lens of the projector so that it projects at an angle higher or lower than it would be if it were on a flat surface. Digital correction involves altering the image before it reaches the projection lens. (http://www.projectorpeople.com/resources/keystone-correction.asp[6/6/2010])

Although pico projectors have been utilized in a variety of applications those applications have not included aircraft systems.

"Virtual" keyboards are becoming more and more commercialized. An optical virtual keyboard optically detects and analyses human hand and finger motions and interprets them as operations on a physically non-existent input device like a surface having painted keys. Celluon, Inc., Seoul, Korea, manufactures a virtual keyboard marketed under the trademark "Magic Cube."

SUMMARY OF THE INVENTION

In one broad aspect, the present invention is a projected button display system, including a detector system, a projector system, and a controller. The detector system includes: a coarse detector subsystem comprising a proximity sensor configured to detect an operator's hand in an activation region; and, a fine detector subsystem configured to detect the position of an operator's finger on a display surface. The projector system is operatively connected to the detector system configured to provide a projected keyboard on the display surface in response to the detection of the operator's hand in the activation region. The projected keyboard is responsive to the touch of the operator's finger on the display surface. The controller operatively connects the detector system and the projector system. The controller provides an output signal a control/management system.

The present inventive concepts are particularly adapted for use on an aircraft cabin side ledge. The fine detector subsystem preferably includes a reflective element, such as a mirror, optically positioned between a fine detector of the fine detector subsystem and the display surface to minimize the distance between the fine detector and the aircraft cabin side ledge. The fine detector subsystem preferably comprises an infrared detector.

The projector system may be, for example, a pico projector. The coarse detector subsystem may include an infrared detector.

In another broad aspect, the present invention can be embodied as a method for providing a virtual keyboard on an aircraft surface, comprising the steps of:

a) detecting an operator's hand in an activation region in the proximity of an aircraft surface utilizing a proximity sensor;

b) generating a projected display on the display surface when the operator's hand is detected in the activation region;

c) detecting the position of an operator's finger on the display surface; and, d) providing an output signal to a control/management system in response to the detection of the position of the finger.

The present invention is particularly advantageous in an aircraft environment where size, weight, and power consumption considerations are imperative. In normal cases where a physical switch is involved they are prone to damage, particularly if positioned on the side ledge where people maintain objects such as drinking cups, etc. The present invention obviates this.

DETAILED DESCRIPTION OF THE INVENTION

Figure 1:
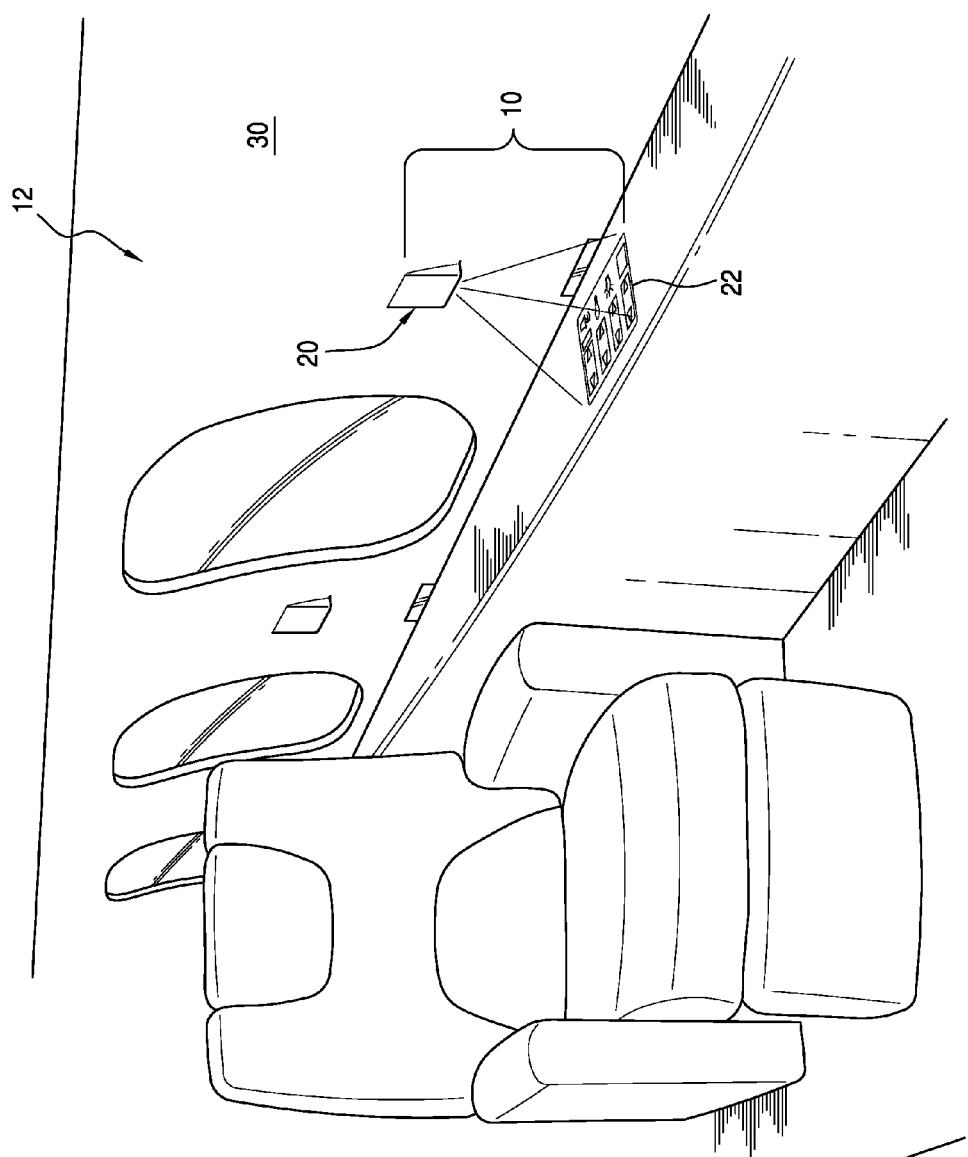
FIG. 1 is a perspective view of the projected button display system utilized in an aircraft cabin.
Figure 2:
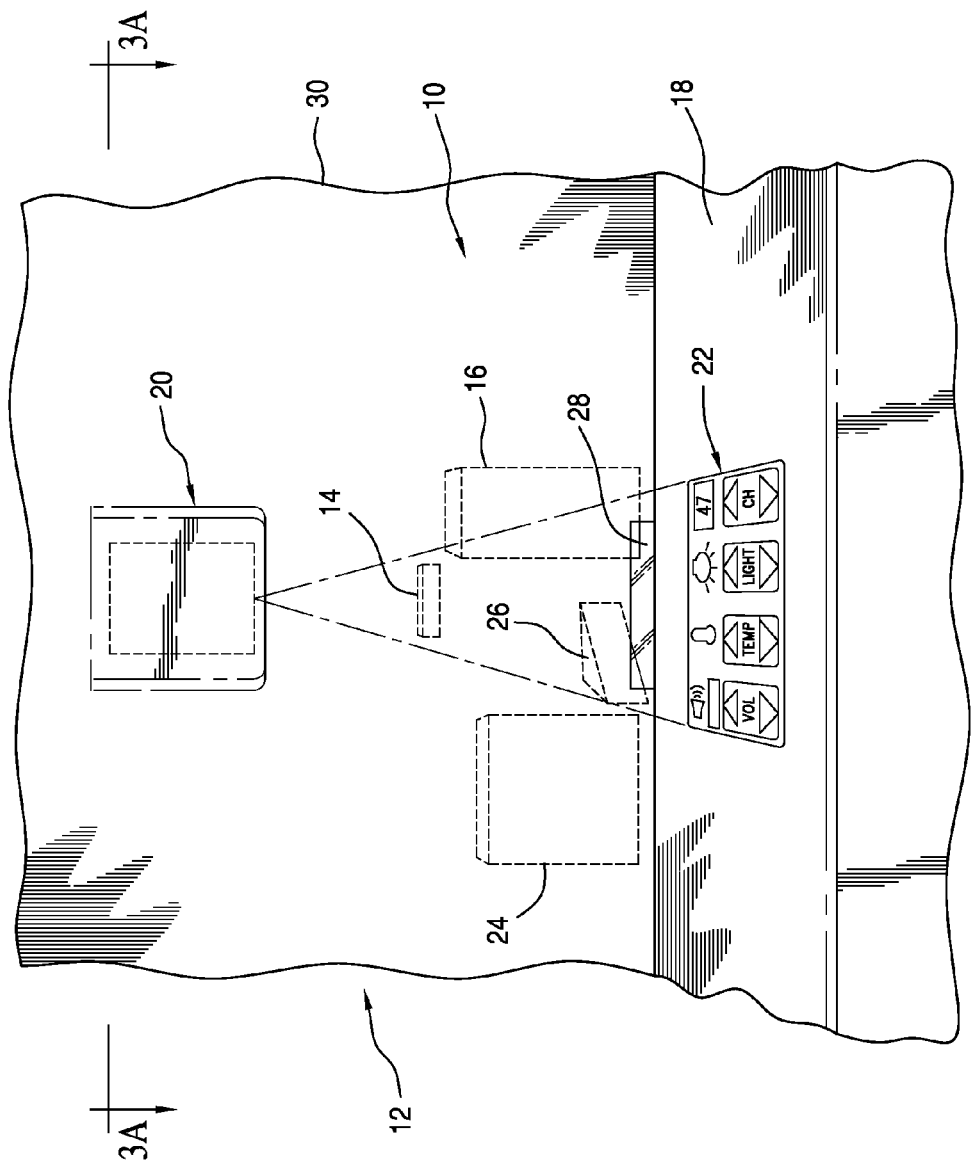
FIG. 2 is perspective view of the side ledge of the aircraft cabin.
Figure 3:
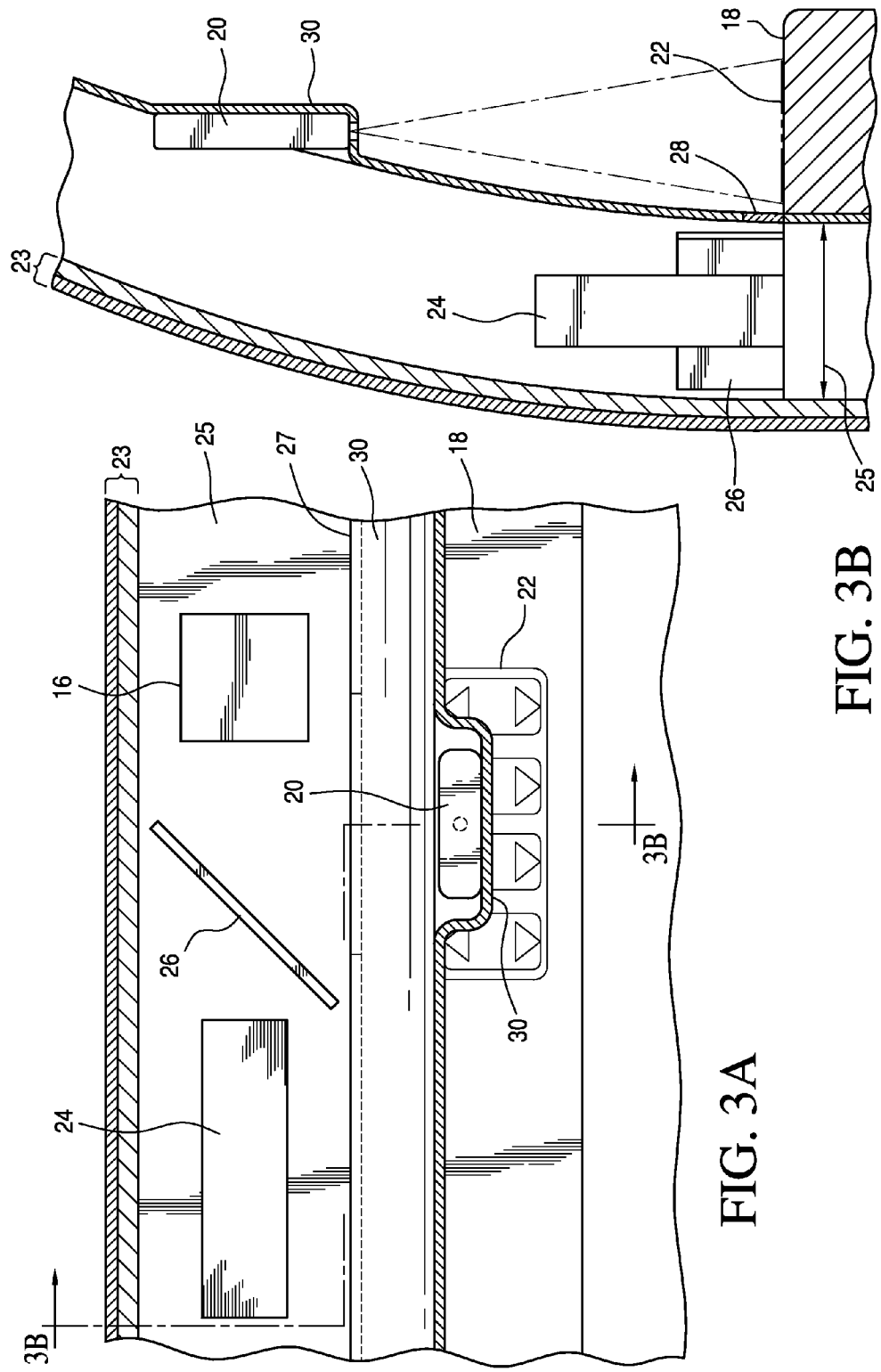
FIG. 3A is a view taken along line 3A-3A of FIG. 2.
FIG. 3B is a view taken along line 3B-3B of FIG. 3A.

Referring now to the drawings and the characters of reference marked thereon, FIGS. 1-4 illustrate the projected button display system, designated generally as 10, mounted within an aircraft cabin 12. The projected button display system 10 includes a detector system 14, 16. The detector system 14, 16 includes a coarse detector subsystem 14 and a fine detector subsystem 16. The coarse detector subsystem 14 includes a proximity sensor configured to detect an operator's hand in an activation region. The fine detector subsystem 16 is configured to detect the position of an operator's finger on a display surface 18.

A projector system, designated generally as 20, operatively connected to the detector system, is configured to provide a projected keyboard 22 on the display surface in response to the detection of the operator's hand in the activation region. The projected keyboard 22 is responsive to the touch of the operator's finger on the display surface 18. A controller 24 operatively connects the detector system and the projector system 20. As the term projected keyboard is used herein it is defined broadly to include switches, controls, control panels, typical computer type keyboards, or any other defined image to provide a desired function.

There is very little room within an aircraft cabin. As a result, creative manners must be provided for control panels taking advantage of real estate within the cabin. In this preferred embodiment the present invention is embodied as being a projected keyboard 22 provided on the side ledge 18 of the aircraft cabin. Referring best to FIGS. 3A and 3B an aircraft typically has skin 23 which may be the outer skin but more typically includes an inner skin of cladding or thermal insulation. The usable distance 25 between the skin 23 and the exterior surface 27 of the sidewall 30 of the cabin 12 is typically about 2.5 inches but may be in a range of between about 2 to 4 inches. The sidewall 30 is typically curved. The side ledge typically has a depth of about 4 inches, but may be in range between about 3 to 7 inches. To optimize space, the fine detector subsystem 16 comprises a reflective element 26 optically positioned between a fine detector of the fine detector subsystem 16 and the side ledge 18 to minimize the distance between the fine detector and the side ledge 18.

The reflective element 26 is typically a mirror but may be, for example, a highly polished metal or other highly reflective material. The detected position of a finger on the display surface is enabled by an optical opening 28 in the sidewall 30 of the cabin 12. Thus, as can be seen, for example in FIG. 2, other than a portion of the projector system 20, the elements of the system 10 of the present invention are located behind the sidewall 30.

The coarse detector system 14 preferably comprises an infrared detector. Alternatively, the coarse detector subsystem 14 may comprise an ultrasound detector or a capacitive detector. Example infrared detectors are marketed by Sharp Microelectronics, Inc., Model No. GP2Y0A21YK, GP2Y0A21YK. These Sharp infrared detectors are marketed as "General Purpose Type Distance Measuring Sensors". An example of an ultrasound detector is such as that marketed by Parallax, Inc., Model No. 28015. This Model No. is marketed as a PING))™ Ultrasonic Distance Sensor.

The fine detector subsystem 16 preferably comprises an infrared detector with an infrared source and a camera sensor. Fine detection may be provided using 3-D electronic perception technology which detects and recognizes the real-time movements of an object in three-dimensional space by a light source and camera sensor. As the user touches the projected pattern, the exact position is detected with a camera sensor and this position is recognized by an algorithm and transferred to the host controller 24. This technology is known in the field, and is commercialized by various companies such as Celluon, Inc.

The nature of the fine detector subsystem 16 provides superior customizability. For example, a hierarchical menu allows the user to easily navigate through a large variety of options. There can be varying button layouts that make button and graphic placement very flexible. There can be varying color schemes so that different colors and sheens are optimized for the type of surface used. The invention provides the implementation of many types of images, e.g. numeric readouts, up/down channel indications, and visual ques. It allows for instant graphic feedback to the user, i.e. a robust image for the user.

The projector system 20 preferably comprises a pico projector. As defined herein the term "pico projector", refers to a projector having the following characteristics: a weight in a range of between about 4 oz and 16 oz; a volume in a range of between about 2.9 cubic inches and 10 cubic inches; power consumption in a range of between about 5 watts and 20 watts. The pico projector may have a brightness in a range of between about 10 and 100 lumens.

The pico projector may include a pico projector light engine including an optics assembly having keystone correction optics for providing keystone correction. The keystone correction optics may include a lens shifting system that optically compensates display surface positioning offset from a position perpendicular to the light being emitted from the pico projector.

Alternatively, the keystone correction may include digital keystone correction. The pico projector may include means for providing the digital keystone correction for predistorting the image to be projected when the display surface is utilized that is not perpendicular to the light being emitted from the pico projector.

A common housing may contain the pico projector and the detector system.

The projector and display surface may be positioned so that the pico projector projects an image substantially perpendicular to the plane of the display surface, thus obviating a need for keystone correction.

Such pico projector systems discussed above are disclosed and claimed in U.S. Ser. No. 12/796,793, entitled "FRONT PROJECTION DISPLAY SYSTEM FOR A VEHICLE" filed on Jun. 9, 2010; and, U.S. Ser. No. 12/796,838, entitled "REAR PROJECTION DISPLAY SYSTEM FOR A VEHICLE", filed on Jun. 9, 2010, both applications being assigned to the present assignee. U.S. Ser. Nos. 12/796,793 and 12/796,838 are incorporated by reference herein in their entireties.

Figure 4:
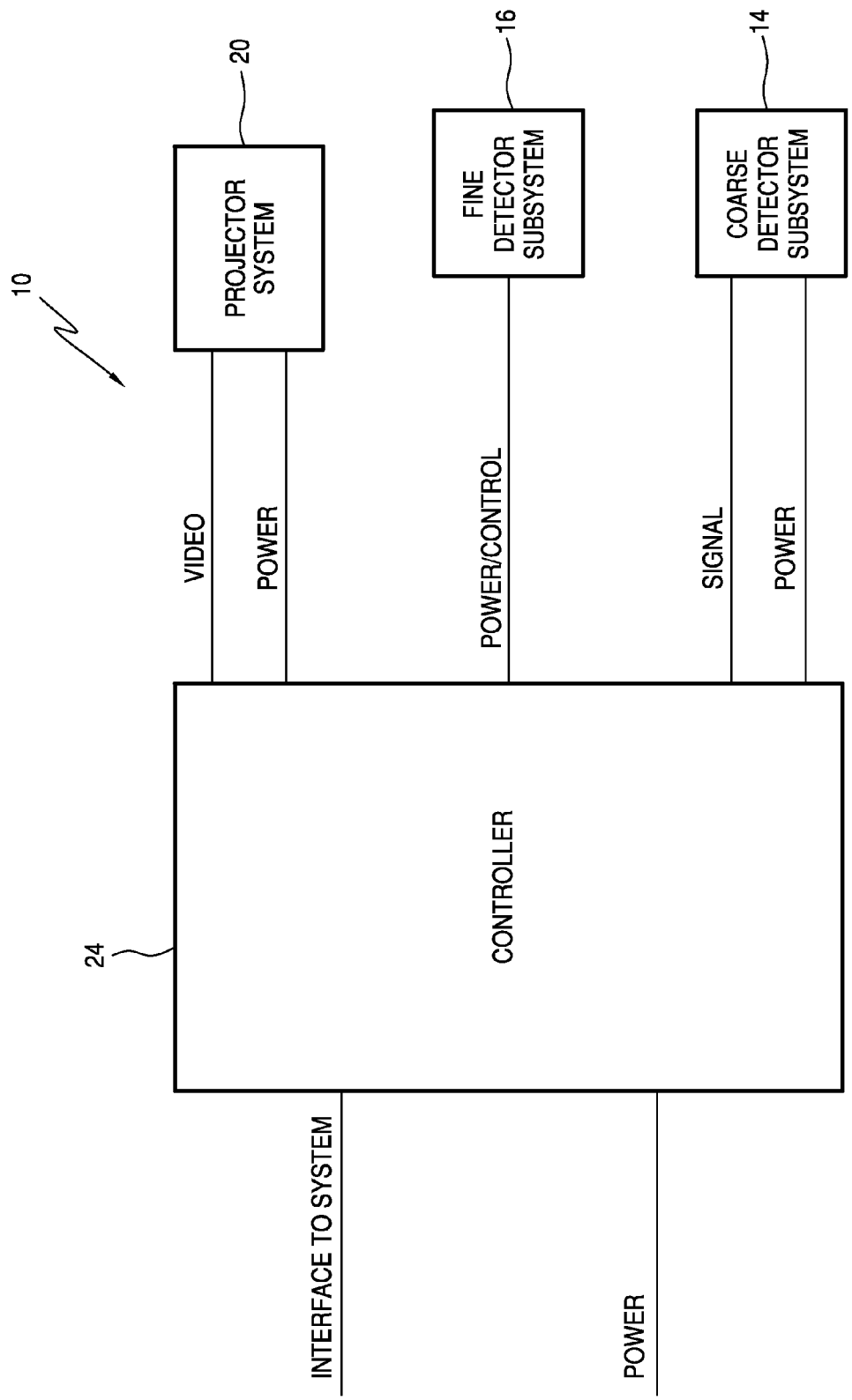
FIG. 4 is a system schematic illustration of the projected button display system of the present invention.

Referring now to FIG. 4, a system schematic illustration of the projected button display system 10 of the present invention is shown. The controller 24 may be, for example, a general purpose microprocessor subsystem typically including a central processing unit, volatile and non-volatile memory, as well as appropriate video and communication interfaces. It also can provide power to the projector system and detector system components. The controller 24 may also provide augmented audio feedback. The controller 24 provides an interface to a control/management system such as a cabin management system, an in-flight entertainment system, a residential home control system, an automobile control system, an industrial control system or many other control/ management systems.

Figure 5B:
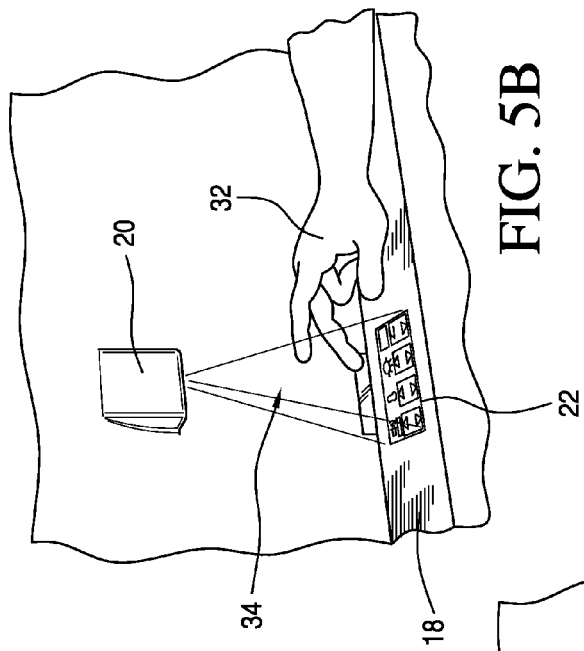
FIG. 5B illustrates an operator's hand positioned within the activation region to activate the coarse detector subsystem to enable the generation of a projected keyboard on the display surface.
Figure 5C:
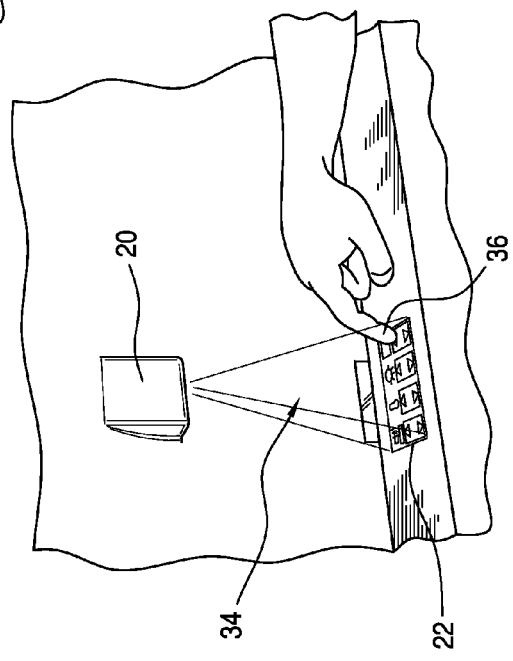
FIG. 5C illustrates an operator's finger touching the projected keyboard to provide commands.
Figure 5A:
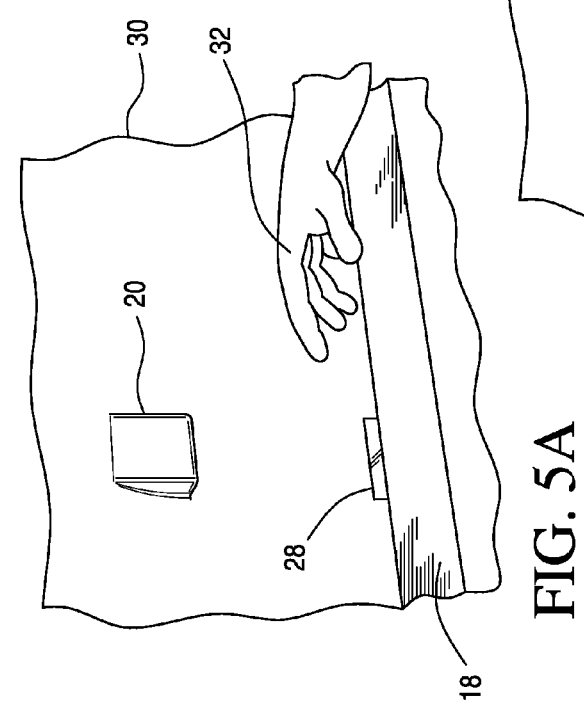
FIG. 5A illustrates an operator's hand moving toward the activation region in the proximity of the aircraft cabin ledge.

Referring now to FIG. 5A, during operation, the operator moves his hand 32 toward an activation region defined by the coarse detector subsystem 14. The activation region can be customized to include boundaries and sensitivity as required by the application.

As shown in FIG. 5B, the operator's hand 32 enters the activation region 34, thus generating the projected keyboard 22 on the display surface 18. As shown in FIG. 5C, the operator's finger 36 touches the projected keyboard to provide positional commands via the fine detector subsystem based on the location of the finger on the display surface 18

Other embodiments and configurations may be devised without departing from the spirit of the invention and the scope of the appended claims.

The invention claimed is:

1. A projected button display system for an aircraft, comprising:
   a) a detector system, comprising:
      i. a coarse detector subsystem comprising a proximity sensor configured to detect an operator's hand in an activation region; and
      ii. a fine detector subsystem configured to detect the a position of an operator's finger on a display surface;
   b) a projector system operatively connected to said detector system wherein said coarse detector subsystem is configured to provide a projected keyboard on said display surface in response to a detection of said operator's hand in said activation region, wherein said projected keyboard is not displayed before detecting the operator's hand in said activation region, said projected keyboard, utilizing said fine detector subsystem, to be responsive to a touch of the operator's finger on said display surface, wherein said display surface comprises a surface in an aircraft passenger cabin and said activation region is above the display surface; and,
   c) a controller comprising a processor and associated memory, for operatively connecting said detector system and said projector system, said controller providing an output signal for a control/management system,
   wherein said display surface comprises a surface on an aircraft passenger cabin side ledge, said side ledge having a depth in a range from 3 to 7 inches,
   wherein said detector system is positioned in a usable distance between a skin of an aircraft and an exterior surface of a sidewall of the aircraft passenger cabin, said usable distance being in a range from 2 to 4 inches.

2. The projected button display system of claim 1, wherein said projector system comprises a pico projector.

3. The projected button display system of claim 1, wherein said fine detector subsystem comprises a reflective element optically positioned between a fine detector of said fine detector subsystem and said display surface to minimize a distance between said fine detector and said display surface.

4. The projected button display system of claim 1, wherein said display surface comprises an aircraft cabin ledge.

5. The projected button display system of claim 1, wherein said display surface comprises a surface on an aircraft passenger cabin side ledge.

6. The projected button display system of claim 1, wherein said detector system is positioned in a usable distance between a skin of an aircraft and an exterior surface of a sidewall of the aircraft passenger cabin.

7. The projected button display system of claim 1, wherein said controller is configured to provide graphic feedback to a user.

8. The projected button display system of claim 1, wherein said coarse detector subsystem comprises an infrared detector.

9. The projected button display system of claim 1, wherein said coarse detector subsystem comprises an ultrasound detector.

10. The projected button display system of claim 1, wherein said coarse detector subsystem comprises a capacitive detector.

11. The projected button display system of claim 1, wherein said fine detector subsystem comprises an infrared detector.

12. A projected button display system for an aircraft, comprising:
   a) a detector system, comprising:
      i. a coarse detector subsystem comprising a proximity sensor configured to detect an operator's hand in an activation region, said coarse detector subsystem comprising an infrared detector; and
      ii. a fine detector subsystem configured to detect a position of an operator's finger on a display surface, said fine detector subsystem comprising an infrared detector;
   b) a projector system operatively connected to said detector system wherein said coarse detector subsystem is configured to provide a projected keyboard on said display surface in response to a detection of said operator's hand in said activation region, wherein said projected keyboard is not displayed before detecting the operator's hand in said activation region, said projected keyboard, utilizing said fine detector subsystem, to be responsive to the touch of the operator's finger on said display surface, wherein said display surface comprises a surface in an aircraft passenger cabin and said activation region is above the display surface, said projector system comprising a pico projector; and,
   c) a controller comprising a processor and associated memory, for operatively connecting said detector system and said projector system, said controller providing an output signal for a control/management system,
   wherein said display surface comprises a surface on an aircraft passenger cabin side ledge, said side ledge having a depth in a range from 3 to 7 inches, and
   wherein said detector system is positioned in a usable distance between a skin of an aircraft and an exterior surface of a sidewall of the aircraft passenger cabin, said usable distance being in a range from 2 to 4 inches.

13. A method for providing a virtual keyboard on an aircraft surface, comprising the steps of:
   a) detecting an operator's hand in an activation region in the proximity of an aircraft surface utilizing a coarse detector subsystem comprising a proximity sensor;
   b) generating a projected display on said display surface when the operator's hand is detected in said activation region, wherein said projected display is not displayed before detecting the operator's hand in said activation region;
   c) detecting a position of an operator's finger on said display surface utilizing a fine detector subsystem; and
   d) utilizing a controller for providing an output signal to a control/management system in response to said detection of the position of said operator's finger on the display surface, wherein said display surface comprises a surface in an aircraft passenger cabin and said activation region is above the display surface,
   wherein said coarse detector subsystem and fine detector subsystem are components of a detector system, and wherein said display surface comprises a surface on an aircraft passenger cabin side ledge, said side ledge having a depth in a range from 3 to 7 inches,
   wherein said detector system is positioned in a usable distance between a skin of an aircraft and an exterior surface of a sidewall of the aircraft passenger cabin, said usable distance being in a range from 2 to 4 inches.

14. The method of claim 13, wherein said step of detecting a position of the finger comprises utilizing a reflective surface for minimizing a distance between said display surface and a fine detector subsystem utilized to detect the position of the finger.

\* \* \* \* \*